(12) United States Patent
Fujinaga

(10) Patent No.: US 9,028,035 B2
(45) Date of Patent: *May 12, 2015

(54) PRINTING CONTROL APPARATUS AND PRINTING CONTROL METHOD

(71) Applicant: Canon Kabushiki Kaisha, Tokyo (JP)

(72) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,010

(22) Filed: Apr. 8, 2014

(65) Prior Publication Data

US 2014/0218433 A1    Aug. 7, 2014

Related U.S. Application Data

(63) Continuation of application No. 13/357,050, filed on Jan. 24, 2012, now Pat. No. 8,714,685.

(30) Foreign Application Priority Data

Jan. 28, 2011    (JP) .................................. 2011-016891

(51) Int. Cl.
| | | |
|---|---|---|
| *B41J 29/38* | (2006.01) | |
| *B41J 13/00* | (2006.01) | |
| *B41J 11/48* | (2006.01) | |
| *G06K 15/00* | (2006.01) | |
| *G06K 15/02* | (2006.01) | |
| *G06K 15/16* | (2006.01) | |
| *H04N 1/23* | (2006.01) | |

(52) U.S. Cl.
CPC ............ *B41J 13/0009* (2013.01); *B41J 11/485* (2013.01); *G06K 15/00* (2013.01); *G06K 15/021* (2013.01); *G06K 15/16* (2013.01); *H04N 1/2323* (2013.01); *H04N 1/2353* (2013.01); *G06K 15/1823* (2013.01)

(58) Field of Classification Search
CPC .............................. B41J 11/485; B41J 11/009
USPC ............ 347/5, 14, 16, 19, 101, 104, 105, 108
See application file for complete search history.

(56) References Cited

U.S. PATENT DOCUMENTS

| | | | |
|---|---|---|---|
| 6,584,291 B1 | 6/2003 | Yamamoto | |
| 8,714,685 B2 * | 5/2014 | Fujinaga | ........................ 347/16 |
| 2005/0207813 A1 | 9/2005 | Takabatake | |

FOREIGN PATENT DOCUMENTS

| | | |
|---|---|---|
| CN | 1515991 A | 7/2004 |
| CN | 101651765 A | 2/2010 |
| JP | 2001-106406 A | 4/2001 |
| JP | 2001-166392 A | 6/2001 |
| JP | 2002-347315 A | 12/2002 |
| JP | 2005-193486 A | 7/2005 |
| JP | 2005-309226 A | 11/2005 |
| JP | 2010-046839 A | 3/2010 |
| JP | 2010-271559 A | 12/2010 |

\* cited by examiner

*Primary Examiner* — Juanita D Jackson
(74) *Attorney, Agent, or Firm* — Canon U.S.A., Inc. IP Division

(57) ABSTRACT

A printing control apparatus configured to execute printing using continuous sheets stored in a plurality of storage portions includes a determination unit configured to determine a continuous sheet usable by each print job in a print queue, and a decision unit configured to decide a use order of the continuous sheets stored in the plurality of storage portions based on a result of determination by the determination unit, wherein the decision unit decides the use order so that a continuous sheet with a smaller remaining amount is used preferentially.

22 Claims, 6 Drawing Sheets

PRINTING CONTROL APPARATUS AND PRINTING CONTROL METHOD

CROSS-REFERENCE TO RELATED APPLICATION

This application is a Continuation of U.S. application Ser. No. 13/357,050 filed Jan. 24, 2012—now U.S. Pat. No. 8,714,685—, which claims the benefit of Japanese Patent Application No. 2011-016891 filed Jan. 28, 2011, which is hereby incorporated by reference herein in its entirety.

BACKGROUND OF THE INVENTION

1. Field of the Invention

The present invention relates to a printing control apparatus and a printing control method used to execute printing using recording material stored in a plurality of storage portions.

2. Description of the Related Art

It is known that, when a conventional printing apparatus having a plurality of storage portions capable of storing recording material such as recording sheets executes printing, such printing apparatus uses the recording material stored in the storage portions while switching the storage portions. With such a printing apparatus, the user checks the type of recording material used by a print job to be executed and sets appropriate recording material in advance. According to a technique discussed in Japanese Patent Application Laid-Open No. 2005-193486, even after printing is started, the use order of a plurality of storage portions storing sheets identical to the sheet that is being used and storage portions into which the currently used sheet can be supplied are indicated. Namely, the technique enables supply of a sheet even during a print process.

However, the technique discussed in Japanese Patent Application Laid-Open No. 2005-193486 assumes that only the cut sheets are used as recording material. Use of a continuous sheet, such as a roll sheet, as recording material is not assumed. When a continuous sheet is used as recording material, unlike cut sheets, the continuous sheet cannot be supplied by addition. The recording material cannot be used appropriately by simply presenting unused storage portions.

SUMMARY OF THE INVENTION

The present invention is directed to a printing control apparatus and a printing control method capable of efficiently using continuous sheets while executing printing, the continuous sheets being stored in a plurality of storage portions.

According to an aspect of the present invention, a printing control apparatus configured to execute printing using continuous sheets stored in a plurality of storage portions includes a determination unit configured to determine a continuous sheet usable by each print job in a print queue, and a decision unit configured to decide a use order of the continuous sheets stored in the plurality of storage portions based on a result of determination by the determination unit, wherein the decision unit decides the use order so that a continuous sheet with a smaller remaining amount is used preferentially.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. Components of a printing control apparatus will be described. However, for example, the relative arrangement and the shapes of the components are illustrated only as examples. Thus, the present invention is not limited to such examples.

Figure 1:
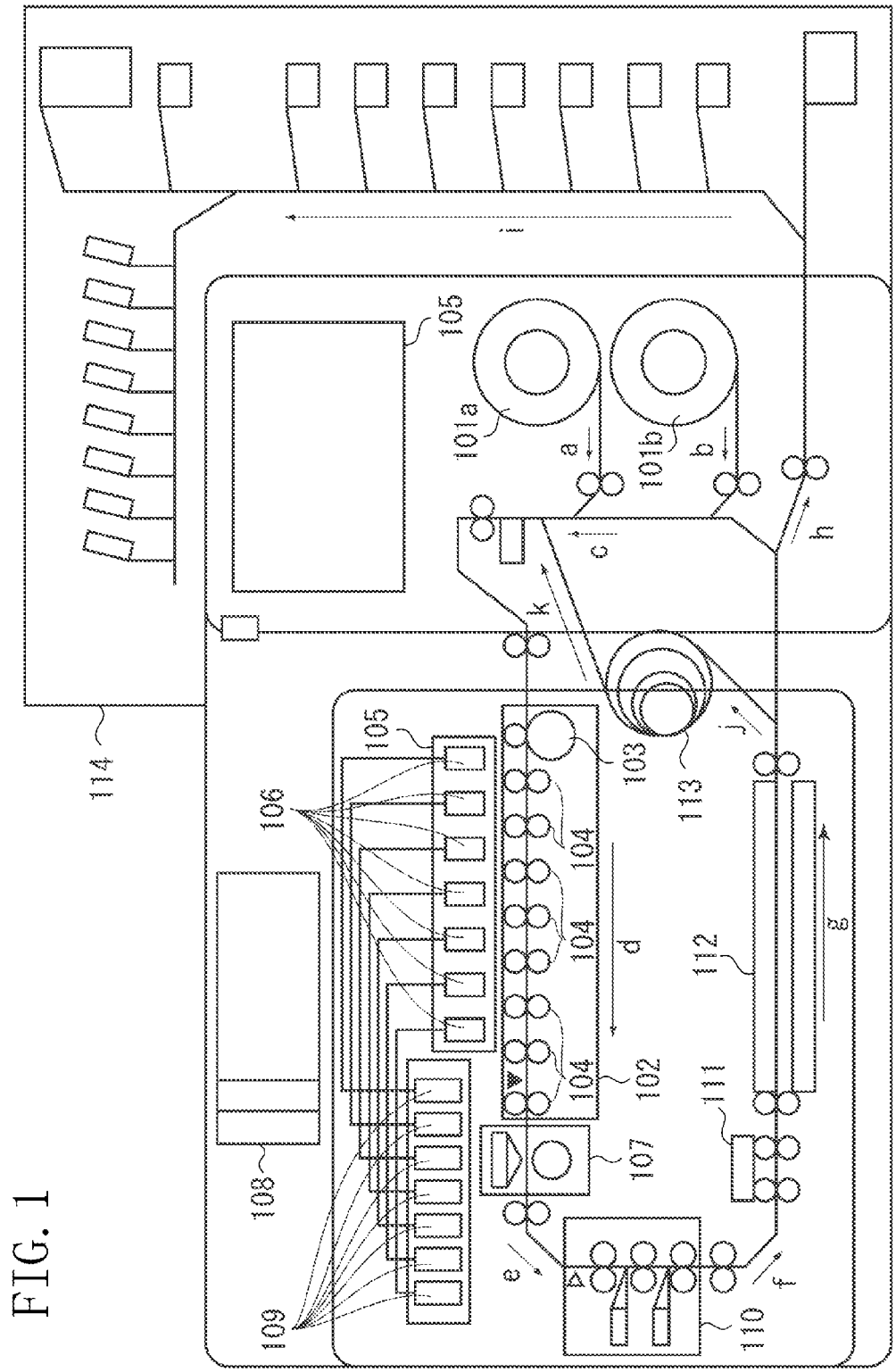
FIG. 1 illustrates an exemplary configuration of an image forming apparatus according to an exemplary embodiment of the present invention.

FIG. 1 schematically illustrates a configuration of an image forming apparatus as an example of a printing control apparatus according to an exemplary embodiment of the present invention. In FIG. 1, the image forming apparatus only has a print function of printing data supplied from an external apparatus. However, the image forming apparatus according to the present exemplary embodiment may additionally include a reading device for reading images on documents, to function as a copying machine. Alternatively, the image forming apparatus may additionally include other functions, to function as a multifunction peripheral.

In this example, the image forming apparatus executes a print process on a roll sheet as recording material (a recording medium or a recording sheet). A roll sheet is an example of a continuous sheet. Alternatively, other recording material than such roll-type recording material may be used. In addition, the image forming apparatus may automatically cut a continuous sheet or the user may manually give instructions to cut a continuous sheet. The recording material is not limited to paper. As long as the image forming apparatus can execute a print process, various types of recording material can be used. In addition, the image forming apparatus may be configured to print not only on continuous sheets but also on cut sheets cut into a predetermined size in advance.

In addition, in the following description, the image forming apparatus prints images based on an ink-jet printing method using image-printing liquid ink. However, any other printing method may alternatively be used. Solid ink may be used as a recording agent applied to the recording material. Namely, the image forming apparatus may use various types of printing methods, such as an electrophotographic method, a sublimation method, a thermal transfer method, and a dot impact method using toner. In addition, the image forming apparatus may be configured to execute not only color recording using multiple colors of recording agent but also monochrome recording using only black recording agent (including gray).

In addition, the image forming apparatus may be configured to print not only visible images but also invisible images and hardly visible images. For example, other than general images, the image forming apparatus may print various types of images such as wiring patterns, physical patterns used in manufacture of components, and DNA sequences. Namely, as long as recording agent can be applied to the recording material, various types of recording apparatuses are applicable as the image forming apparatus according to the present exemplary embodiment. If an external apparatus connected to the image forming apparatus in FIG. 1 gives instructions to control print operations of the image forming apparatus, this external apparatus functions as the printing control apparatus.

FIG. 1 is a cross section schematically illustrating the overall configuration of the image forming apparatus using a roll sheet as recording material (a continuous sheet having a length greater than a unit printing length (one page) in the conveyance direction). The image forming apparatus includes an upper sheet cassette 101a, a lower sheet cassette 101b, a conveyance unit 102, a conveyance encoder 103, rotary rollers 104, a head unit 105, print heads 106, a scanner unit 107, a control unit 108, ink tanks 109, a cutter unit 110, a back-side print unit 111, a drying unit 112, a sheet winding unit 113, a sorting unit 114, and an operation unit 115, which are disposed within a single housing. However, these components may be disposed separately in multiple housings.

The control unit 108 includes a control portion including a controller (including a central processing unit (CPU) or a micro processing unit (MPU)), an output device for outputting user-interface information (a device for generating display information and sound information), and various input/output (I/O) interfaces. The control unit 108 executes various control operations for the entire image forming apparatus.

In addition, the image forming apparatus includes an upper sheet cassette 101a and a lower sheet cassette 101b for storing and supplying a roll sheet. After fitting a roll sheet (hereinafter referred to as a sheet) into a magazine, the user fits the magazine into the image forming apparatus. The sheets are conveyed from the upper and lower sheet cassettes 101a and 101b in directions a and b in FIG. 1, respectively. The sheet conveyed from either of the two cassettes travels in direction c in FIG. 1 and reaches the conveyance unit 102. During a print process, the conveyance unit 102 uses a plurality of rotary rollers 104 to convey the sheet in direction d (horizontal direction) in FIG. 1.

If the source sheet cassette is changed from one cassette to the other, first, the currently conveyed sheet is rewound to the current source sheet cassette. Next, a new sheet is conveyed from the other cassette. In addition, new sheet cassettes can be added in increments of two cassettes. The added sheet cassettes are disposed on the right side of the sheet cassettes 101a and 101b in FIG. 1, respectively. The sheets from these added sheet cassettes also travel in the directions a and b, respectively. When exchanging a roll sheet from a sheet cassette, the user first opens the magazine door corresponding to the sheet, extracts the roll sheet (extracts the tube of the roll sheet if the roll sheet has been used completely), and fits a new roll sheet into the magazine. While a sheet magazine door is open, sheet supply from the corresponding sheet cassette is prohibited.

In addition, a sensor measures the roll diameter of the roll sheet set in a sheet cassette to estimate a remaining amount (length). If the roll sheet is used by a print process, the sensor measures the length of the roll sheet used and updates the remaining amount. In addition, the sensor also measures the diameter of the roll sheet regularly to suitably correct the remaining amount. Other than measuring the diameter, the sensor may use various other methods. For example, the sensor may measure the radius of the roll sheet or the distance between the roll tube and the outermost position of the roll sheet.

The head unit 105 is disposed above the conveyance unit 102 so that the head unit 105 faces the conveyance unit 102. The head unit 105 holds a plurality of print heads 106, each of which contains a different color (seven colors in the present exemplary embodiment), in the sheet conveyance direction. More specifically, in this exemplary embodiment, the head unit 105 holds seven print heads 106 corresponding to seven colors of cyan (C), magenta (M), yellow (Y), light cyan (LC), light magenta (LM), gray (G), and black (K). Needless to say, other colors may additionally be used or only some of the above colors may be used.

With the image forming apparatus, the print heads 106 discharge ink to form an image on a sheet in synchronization with sheet conveyance by the conveyance unit 102. The print heads 106 are disposed so that ink discharge destinations do not overlap with the rotary rollers 104. Instead of directly discharging ink on the sheet, the print heads 106 may first apply ink to an intermediate transfer member. In this way, the image forming apparatus forms an image by applying the ink on the intermediate transfer member to the sheet. A printing unit according to the present exemplary embodiment is configured to include these conveyance unit 102, head unit 105, and print heads 106.

The image forming apparatus includes ink tanks 109, each of which stores ink of a different color. The ink is supplied from the ink tanks 109 to sub-tanks via tubes, and each of the sub-tanks is disposed to correspond to a color. Next, the ink is supplied from the sub-tanks to the respective print heads 106 via tubes. Regarding the print heads 106, the line heads of the individual colors (seven colors in the present exemplary embodiment) are arranged in direction d, which is the conveyance direction during a print process. Each of the line heads of the individual colors may be formed by a single seamless nozzle chip or separate nozzle chips arranged regularly in a line or in a staggered pattern.

In the present exemplary embodiment, nozzles are arranged to cover the width of the printing area of a sheet having a maximum size that can be used by the present image forming apparatus. Namely, a full multi-head is used. While an ink-jet method in which ink is discharged from nozzles is used, a method using a heating element, a method using a piezoelectric element, a method using an electrostatic element, a method using a micro electro mechanical systems (MEMS) element, or the like can be used. Each of the head nozzles discharges ink based on print data, and an output signal from the conveyance encoder 103 determines the discharge timing.

After an image is formed on the sheet, the sheet is conveyed from the conveyance unit 102 to the scanner unit 107. The scanner unit 107 optically reads the image or particular patterns printed on the sheet, to check whether there are any problems with the printed image. For example, the scanner unit 107 also checks the status of the present apparatus, including the ink discharge status. Various methods can be used to check the printed image. For example, the scanner unit 107 may be configured to check the ink discharge status by reading a pattern for checking the head status. The scanner unit 107 may be configured to check success and failure of the printing by comparing the printed image with the original image. An appropriate check method can be selected from various methods.

Next, the sheet is conveyed from the scanner unit 107 in direction e and is introduced into the cutter unit 110. The cutter unit 110 cuts the sheet into pieces each having a predetermined unit printing length. This predetermined unit printing length varies depending on the size of the printed image. For example, an L-size photograph has a length of 135 mm in the conveyance direction, and an A4-size photograph has a length of 297 mm in the conveyance direction. In one-sided printing, the cutter unit 110 cuts the sheet per page. However, depending on the print job, the cutter unit 110 does not cut the sheet per page.

In two-sided printing, instead of cutting the sheet per page, the cutter unit 110 continues printing images for a predetermined length on a first side (the side on which images are printed first, e.g., the front side) of the sheet. After images are printed on a second side (the side on which images are printed next, e.g., the backside), the cutter unit 110 cuts the sheet per page. The cutter unit 110 is not limited to such type that cuts the sheet per image after one-sided printing or after back-side printing of two-sided printing. The sheet may be cut after being conveyed for a predetermined length. For example, the sheet may be cut manually by a different cutter device per image (page). If the sheet needs to be cut in the width direction, a different cutter device is used.

The sheet is further conveyed from the cutter unit 110 to the back-side print unit 111 in direction f in FIG. 1. In one-sided printing, the back-side print unit 111 prints predetermined information on the back side of the sheet. For example, the back-side print unit 111 prints information corresponding to each of the printed images on the back side of the sheet, examples of such information include text, symbols, and codes (order management numbers, for example). In two-sided printing, the back-side print unit 111 prints the above information on an area outside the images printed by the print heads 106. The back-side print unit 111 can use a recording-agent imprinting method, a thermal transfer method, an ink-jet method, or the like.

Next, the sheet is conveyed from the back-side print unit 111 to the drying unit 112. To dry the sheet onto which ink has been applied in a short time, the drying unit 112 uses hot air (heated gas (air)) to heat the sheet while the sheet passes through the drying unit 112 in direction g in FIG. 1. Instead of using hot air, the drying unit 112 may use various types of drying methods. For example, cold air may be used. Alternatively, a heater may be used to heat and dry the sheet. Further alternatively, the sheet may be left to stand to dry the sheet naturally. Further alternatively, the sheet may be irradiated with an electromagnetic wave such as ultraviolet light. Each of the sheets cut into a unit printing length passes through the drying unit 112 and is conveyed to the sorting unit 114 in direction h in FIG. 1.

The sorting unit 114 holds a plurality of trays (18 trays in the present exemplary embodiment) and distinguishes the trays as sheet discharge destinations depending on the unit printing length and the like. Each of the trays is allocated with a tray number. The sorting unit 114 discharges the sheets traveling in direction i in FIG. 1 to a tray having a tray number set for each printed image while sensors disposed above the respective trays check whether the respective trays are available or filled with sheets. An apparatus (host apparatus) that issues a print job may specify a certain tray as a discharge destination of cut sheets. Alternatively, the image forming apparatus may arbitrarily specify an available tray. Each of the trays can accept a predetermined number of sheets. If a print job requires printing of a number of sheets exceeding this predetermined number of sheets, the sheets are discharged to a plurality of trays.

For example, a tray can accept a different number, size, and type of sheets, depending on the size (type) of the tray. A group of trays (hereinafter, large trays) arranged vertically in FIG. 1 can accept both large-size sheets (larger than L-size sheets, such as A4-size sheets) and small-size sheets (L-size sheets). While a group of trays (hereinafter, small trays) arranged horizontally can accept small-size (L-size) sheets, this group cannot accept large-size sheets. The large trays can accept more sheets than the small trays.

In addition, indicators can be used to notify the user of various sheet discharge statuses (light-emitting diodes (LEDs) can be used, for example). For example, the user can recognize whether the sheets are being discharged or have been discharged completely. For example, each of the trays may have a plurality of LEDs each emitting a different color of light. In this way, the user can recognize various statuses of each tray, depending on the color or the blinking status of a lit LED. In addition, each of the plurality of trays can be allocated with a priority. In this way, when executing a print job, the image forming apparatus sequentially allocates available trays (trays storing no sheets) as sheet discharge destinations based on the priorities. At the default settings, an upper large tray has a higher priority than a lower large tray, and a small tray arranged more to the left has a higher priority than a small tray arranged more to the right. In addition, the small trays have higher priorities than the large trays. Users may previously allocate a higher priority to a certain tray from which sheets can be extracted more easily. Alternatively, users may change the priorities manually, as needed.

In two-sided printing, after images are printed on the front side of the sheet, the sheet winding unit 113 winds the sheet that is not cut per page. More specifically, in two-sided printing, first, the print heads 106 print images on the front side of a sheet, and next, instead of cutting the sheet per page immediately, the cutter unit 110 cut the sheet after the print heads 106 complete printing on the continuous front side. After images are printed on the front side, the sheet travels through the drying unit 112 and proceeds in direction j in FIG. 1. Subsequently, the sheet winding unit 113 winds the sheet. Next, after images have been printed on a series of pages on the front side and the sheet has been wound, the sheet is conveyed from the sheet winding unit 113 in direction k in FIG. 1. The side opposite to the front side is used as the print side. Namely, the sheet is turned over so that the back side thereof faces the print heads 106. By conveying the sheet in this way, images can be printed on the back side, which is the opposite side of the front side. In normal one-sided printing, after images are printed on a sheet, the sheet is not wound by the sheet winding unit 113 but is conveyed directly to the sorting unit 114.

As described above, in two-sided printing, the sheet winding unit 113 winds and turns over the sheet, and the print heads 106 prints images on the back side of the sheet. Therefore, when a sheet is discharged to the sorting unit 114, the side of the sheet differs between one-sided printing and two-sided printing. Namely, in one-sided printing, since the sheet winding unit 113 does not turn over the sheet, the sheet is discharged facedown (the image printed on the first page face down). If a single print job generates images on a plurality of pages, the first-page sheet is first discharged to a tray. Subsequently, the following pages are sequentially discharged and piled in the tray. This discharge is referred to as face-down discharge.

On the other hand, in two-sided printing, since the sheet winding unit 113 turns over the sheet, the first-page sheet is discharged faceup. If a single print job generates a plurality of sheets, the last-page sheet is first discharged to a tray. Subsequently, the pages are sequentially discharged and piled in the descending order. Finally, the first-page sheet is discharged. This discharge is referred to as face-up discharge. The print order (descending order or ascending order) of the first side may be changed between one-sided printing and two-sided printing. In this way, whether in one-sided printing or in two-sided printing, the sheets are discharged with the same side up (either faceup or facedown).

The operation unit 115 receives various instructions from users and displays various information to users. For example, with the operation unit 115, users can check which tray stores a sheet printed with a user-specified image. In addition, users can check whether the image is being printed or has already been printed. Namely, users can check various print statuses per order. In addition, for example, users can operate/check the operation unit 11 to check the amount of remaining ink, the number of remaining sheets, and various statuses of the apparatus. In addition, with the operation unit 11, users can give instructions for maintenance of the apparatus, such as for head cleaning.

Figure 2:
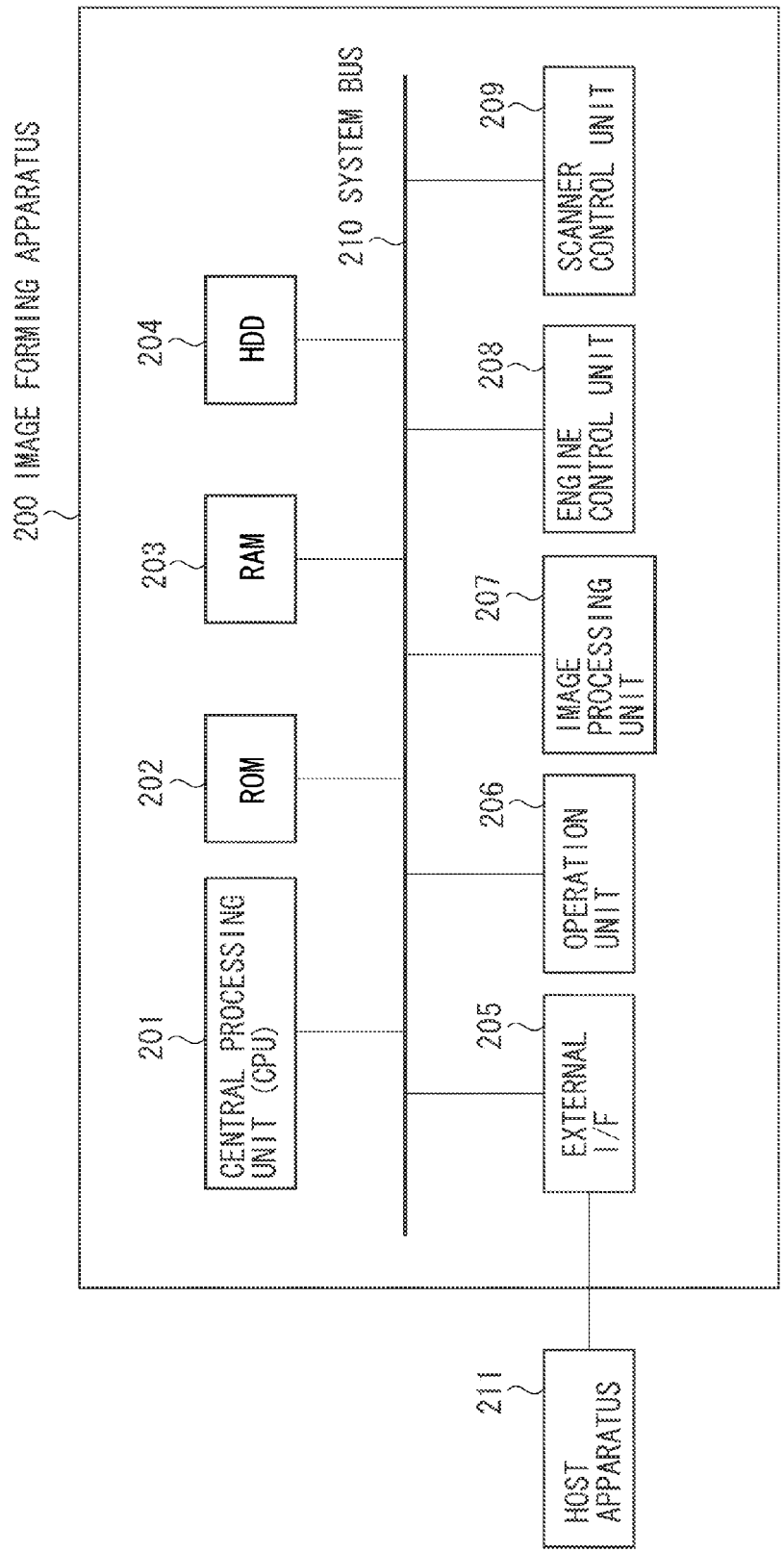
FIG. 2 is a block diagram illustrating a configuration relating to control of the image forming apparatus in FIG. 1.

FIG. 2 is a block diagram illustrating a configuration relating to control of the image forming apparatus illustrated in FIG. 1. An image forming apparatus 200 corresponds to the image forming apparatus illustrated in FIG. 1. Various changes can be made to the following configuration used as an example.

The control unit 108 mainly includes a CPU 201, a read-only memory (ROM) 202, a random access memory (RAM) 203, an image processing unit 207, an engine control unit 208, and a scanner control unit 209. The control unit 108 is connected to a hard disk drive (HDD) 204, an operation unit 206, an external I/F 205, and the like via a system bus 210.

The CPU 201 is a microprocessor (microcomputer)-type central processing unit and is included in the control unit 108 in FIG. 1. The CPU 201 controls the overall operation of the image forming apparatus 200 by executing programs and booting hardware devices. The ROM 202 stores programs executed by the CPU 201 and fixed data necessary for various operations of the image forming apparatus 200. The RAM 203 is used as a work area for the CPU 201 and as a temporary storage area for various reception data. The RAM 203 stores various setting data. The HDD 204 can store and read programs executed by the CPU 201, print data, setting information necessary for various operations of the image forming apparatus 200. Instead of the HDD 204, another mass-storage device may be used.

The operation unit 206 includes hard keys and a touch panel with which users input various instructions and a display unit that notifies users of various information. The operation unit 206 corresponds to the operation unit 115 in FIG. 1. A sound generator may output sound (buzzer, voice, etc.) based on sound information to notify users of information.

The image processing unit 207 rasterizes (converts) print data (for example, data represented by page description language) processed by the image forming apparatus 200 into image data (bitmap image). In addition, the image processing unit 207 executes image processing. The image processing unit 207 converts the color space (YCbCr, for example) of image data included in input print data into the standard RGB color space (sRGB, for example). In addition, the image processing unit 207 executes various image processing such as image analysis and image correction, as needed. For example, the image processing unit 207 converts resolution of the image data into an effective pixel number processable by the image forming apparatus 200. The image data obtained by such image processing is stored in the RAM 203 or the HDD 204.

Based on a control command supplied from the CPU 201 or the like, the engine control unit 208 controls printing of an image on a sheet based on print data. For example, the engine control unit 208 instructs the print heads 106 of the individual colors to discharge ink and sets discharge timings for adjusting dot positions (ink impact positions) on a recording medium. In addition, by acquiring a head drive status, the engine control unit 208 makes various adjustments. Based on print data, the engine control unit 208 controls the print heads 106 and instructs the print heads 106 to discharge ink and form an image on the sheet. In addition, for example, the engine control unit 208 drives extraction rollers for extracting a sheet from a cassette, drives conveyance rollers for conveying the extracted sheet, and acquires the rotation status of the conveyance rollers. Namely, by controlling the conveyance rollers, the engine control unit 208 conveys and stops a sheet along an appropriate path at an appropriate speed.

Based on a control command supplied from the CPU 201 or the like, the scanner control unit 209 controls an image sensor, reads an image on the sheet, acquires analog luminance data of red (R), green (G), and blue (B), and converts the data into digital data. As the image sensor, a charge-coupled device (CCD) image sensor, a complementary metal-oxide semiconductor (CMOS) image sensor, or the like can be used. In addition, the image sensor may be a linear image sensor or an area image sensor. In addition, the scanner control unit 209 drives the image sensor, acquires the status of the driven image sensor, and analyzes luminance data acquired from the image sensor. In this way, for example, the scanner control unit 209 can detect that the print heads 106 are not discharging ink. Also, the scanner control unit 209 can detect sheet cut positions. If the scanner control unit 209 determines that an image is correctly printed on the sheet, after the drying unit 112 dries ink on the sheet, the sheet is discharged into a specified tray in the sorting unit 114.

A host apparatus 211 corresponds to the above external apparatus and is connected to the present image forming apparatus 200 externally. The host apparatus 211 is a source that supplies image data to be printed by the image forming apparatus 200 and that outputs various print job orders.

The host apparatus 211 may be a general-purpose personal computer (PC) or a data supply apparatus of a different type. Examples of the data supply apparatus other than a general-purpose PC include an image capture apparatus that captures an image and generates image data. The image capture apparatus may be a reader (scanner) that reads an image on a document and generates image data or may be a film scanner that reads negative film or positive film and generates image data. In addition, other examples of the image capture apparatus include: a digital camera that captures a still image and generates digital image data; and a digital video camera that captures a moving image and generates moving image data. In addition, a photo storage may be created on a network and image files may be stored in the photo storage. In this way, by acquiring an image file via the network, the image forming apparatus 200 can print an image based on image data generated from the image file. The image forming apparatus 200 may be provided with a socket into which a portable memory detachable to the image forming apparatus 200 can be inserted. In this way, the image forming apparatus 200 can read image files stored in the portable memory, generate image data, and print images.

Alternatively, instead of a general-purpose PC, a dedicated terminal for the present image forming apparatus may be used. Namely, various data supply apparatuses may be used. These data supply apparatuses may be used as components of the image forming apparatus or as separate apparatuses connected to the image forming apparatus externally. If a PC is used as the host apparatus 211, an operating system (OS), application software for generating image data, and a printer driver for the image forming apparatus 200 are installed in a storage device of the PC. The printer driver controls the present image forming apparatus 200, converts image data supplied from application software into a format processable by the image forming apparatus 200, and generates print data. After the host apparatus 211 converts print data into image data, the image forming apparatus 200 may be supplied with the image data.

It is not necessary that all of the above processing be realized by software. Part or all of the processing may be realized by hardware such as an application specific integrated circuit (ASIC). Image data, other commands, status signals, and the like can be exchanged between the host apparatus 211 and the image forming apparatus 200 via the external I/F 205. The external I/F 205 may be a local I/F or a network I/F. In addition, the external I/F 205 may establish wired connection or wireless connection. Since connected to each other via the system bus 210, the above components in the image forming apparatus 200 can communicate with each other.

While the single CPU 201 controls all the components in the image forming apparatus 200 illustrated in FIG. 2 in the above example, the present invention is not limited to such example. Namely, some of the functional blocks may have a separate CPU to control the respective components. In addition, the individual functional blocks may be divided in a way different from that illustrated in FIG. 2 and be used as separate processing units or control units as needed. Alternatively, some of the functional blocks may be integrated. Namely, the individual functional blocks may be formed in various ways. In addition, a direct memory access controller (DMAC) may be used to read data from a memory.

When the image forming apparatus 200 executes printing on a roll sheet based on the above configuration, the CPU 201 executes a print process as follows. First, when the image forming apparatus 200 receives a new print job, the CPU 201 temporarily stores data in the HDD 204. Next, the CPU 201 checks print settings set in the print job stored in the HDD 204 (usable sheet sizes and materials as well as the print mode (one-sided printing, two-sided printing, bookbinding printing, etc.)). Based on the print settings, the CPU 201 determines the printing order (the page order) of this print job. Namely, when the face-down discharge is executed, if one-sided printing is set, the CPU 201 determines that printing is executed with the lower page number first. If printing is executed on the two sides of a sheet (two-sided printing, bookbinding printing), the pages on the side opposite to the first-page side are sequentially printed on the first side of the sheet, with the largest page number first in descending order. Next, the pages on the opposite side are printed on the second side of the sheet in ascending order. In normal two-sided printing, the CPU 201 determines the print order so that the even-numbered pages are printed continuously in descending order on the first side and the odd-numbered pages are printed continuously in ascending order on the second side.

In addition, when the image forming apparatus 200 executes two-sided printing, if the same sheet is usable for the preceding and following print jobs, first, the first side is continuously printed for these print jobs. Next, the second side is continuously printed. In this way, the sheet is turned over less frequently. Thus, the CPU 201 determines the print order by checking print settings of the preceding and following print jobs. In this step, the CPU 201 also determines a sheet to be used based on print settings of the target, preceding, and following print jobs, so that the same sheet can preferably be used and the printing can continuously be executed.

Printing a plurality of pages (images) continuously simply means printing pages on a single side of a sheet continuously, irrespective of presence of a space between pages. Namely, a sheet may include a margin between pages. In addition, a sheet may include a page on which no printed image is present, depending on the page configuration of the print job.

In addition, each time the image forming apparatus 200 receives new print jobs, the print jobs are sequentially registered in a queue set in the HDD 204. Next, in accordance with the above print settings, sheet information about sheets used by the print jobs in the queue (sizes and materials), the cassettes used based on the sheet information, and the status of the print jobs (progress situations, availability of error messages, etc.) are managed in the HDD 204. In addition, the print start time (date and time) and the required time are also calculated for each print job based on each print job, and the obtained information is also managed.

After the CPU 201 determines the print order as described above, print data about print jobs is supplied to the image processing unit 207 so that the first print job in the queue is printed and completed first. In two-sided printing, as described above, pages on the first side are continuously printed for a plurality of print jobs. Thus, among a plurality of print jobs printed continuously, print data of the last print job is first supplied to the image processing unit 207 (in the case of face-down discharge). Namely, the last one of the print jobs continuously printed is printed first. More specifically, among the pages on the side opposite to the first-page side, the last page is first printed and the other pages are sequentially printed in descending order on the first side of the sheet. Finally, the first page of the first print job on this first side is printed. Subsequently, the first page of the first print job is printed on the second side of the sheet, and the next print job is sequentially printed on the second side. As a result, printing of the first print job is completed first with face-down discharge.

The image data to be printed that is generated based on the print data received by the image processing unit 207 is sequentially stored in the HDD 204. The image data stored in the HDD 204 is sequentially supplied to the engine control unit 208, based on the determined print order. Simultaneously with the image data, information based on attributes such as print settings set in a print job is supplied to the engine control unit 208. Examples of the information include: information indicating the sheet side on which image data needs to be printed (in the case of two-sided printing); information about page numbers; and information identifying print jobs. In addition, depending on the printing method or the like, images stored in the HDD 204 may be rotated on a 90-degree basis.

Upon receiving the image data, the engine control unit 208 causes a sheet cassette corresponding to the size of the image to be printed to supply a sheet and causes the sheet to be conveyed to an appropriate print position for the head unit 105. Next, based on the image data, the engine control unit 208 causes the print heads 106 to discharge ink to form an image on the sheet. Next, the scanner unit 107 determines success or failure of the printed image. If the printing is appropriate, the drying unit 112 dries the sheet. If the printing is inappropriate, the cutter unit 110 cuts the sheet, and the sheet is discharged to one of the trays used for defects in the sorting unit 114 (to the lowermost tray, for example). If the printing is inappropriate, the engine control unit 208 is supplied with the image data, again, and the above process is repeated to print an image. In two-sided printing, unless images are appropriately printed on both the front and back sides, images are printed again.

If the engine control unit 208 executes a print job in one-sided printing, the cutter unit 110 cuts the printed sheet per page. Next, the cut sheets are discharged to a tray specified by the sorting unit 114. On the other hand, if the engine control unit 208 executes two-sided printing and continuously prints a plurality of pages on the first side, even after the first side is printed, the cutter unit 110 does not cut the sheet per page. After the last page is printed, the cutter unit 110 cuts the sheet. After the first side of the sheet is printed with images, the sheet is supplied to the sheet winding unit 113, and the second side is printed. In this step, the sheet winding unit 113 is rotated reversely, and the sheet is supplied to the head unit 105 with the cut side first. Next, after the second side is printed, the cutter unit 110 cuts the sheet per page (depending on the print settings, the sheet may not be cut per page). Next, after the sheet is printed and cut, the cut sheets are discharged to a tray specified in the sorting unit 114. In addition, after the sheet is cut, if necessary, the back-side print unit 111 prints information. Thus, steps of a print process are sequentially executed as described above, and as the print process progresses, information about print jobs managed by a queue is updated.

Figure 3:
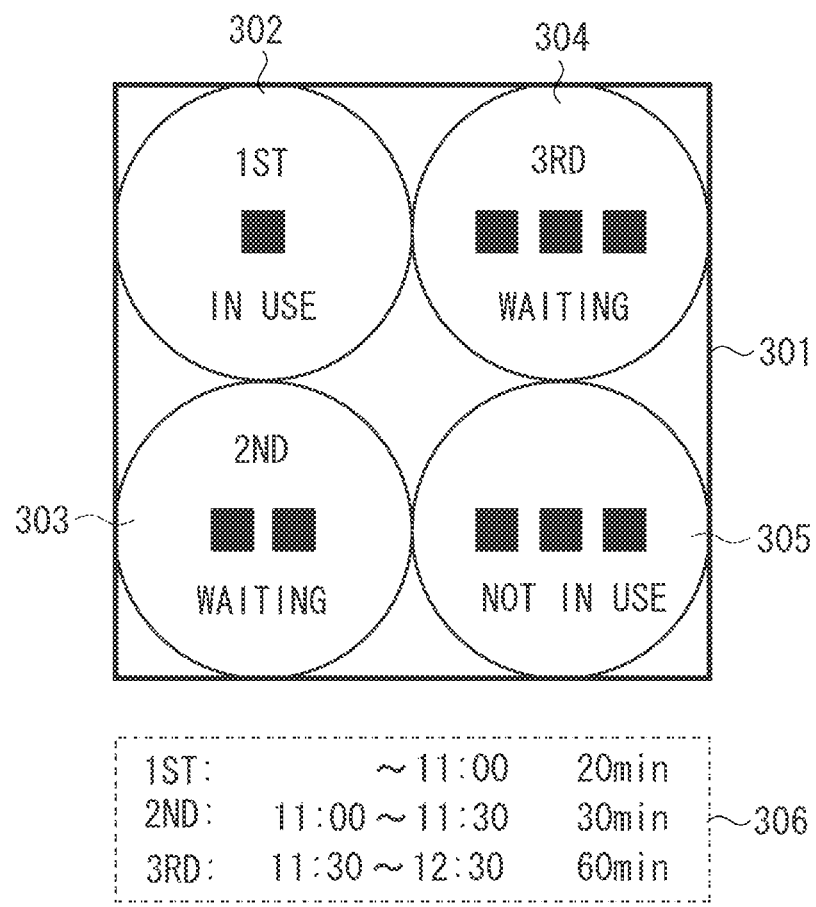
FIG. 3 illustrates an example of a display screen displaying a sheet status of each sheet cassette.

Next, a display method for presenting the status of the sheets in the individual sheet cassettes to users will be described. FIG. 3 illustrates an example of the display screen of the operation unit 115 (the operation unit 206) displaying the sheet status of each sheet cassette and the status of each print job. In FIG. 3, two sheet cassettes are added, and a total of four sheet cassettes are present in the image forming apparatus 200.

In FIG. 3, a display area 301 displays the status of each of the sheets in the sheet cassettes. The number of sheet cassettes displayed in the display area 301 may vary depending on the number of sheet cassettes in the image forming apparatus 200. Alternatively, the number of sheet cassettes may be fixed, that is, the display area 301 may display only the number of sheet cassettes present.

Areas 302 and 303 indicate the statuses of the sheets set in the sheet cassettes 101a and 101b, respectively. Similarly, areas 304 and 305 indicate the statuses of the sheets set in the additional upper and lower sheet cassettes, respectively. The arrangement of the sheet cassettes in FIG. 3 corresponds to that of the sheet cassettes in FIG. 1, that is, to the arrangement of the sheet cassettes viewed from the display screen of the operation unit 115. Thus, the user can easily intuitively grasp which area indicates which sheet status.

As illustrated in FIG. 3, the order in which the sheets set in the sheet cassettes are used is displayed. A character string "1st" is displayed for a sheet cassette storing a sheet that is being used or that is to be used first, and a character string "X-th (X is a natural number representing the user order) for a sheet to be used subsequently. The character string "X-th" is not displayed for a sheet that is not to be used. The use order is determined based on information about the print jobs managed in a queue. The use order may be determined accurately based on the length of a sheet used by each print job and the remaining amount of a sheet stored in each sheet cassette. The length of a sheet that is to be used may be determined based on a sheet possibly used, irrespective of the remaining sheet amount. Thus, particularly in the latter case, after an actual print operation is executed, a sheet may be present in a sheet cassette that is not used. In such a case, the print order is updated dynamically.

In FIG. 3, a symbol such as a black (filled) square represents an approximate remaining sheet amount. More symbols represent a more remaining amount. While displayed in three levels in FIG. 3, the remaining sheet amount may be displayed in an arbitrary number of levels as needed. For example, when a sheet is used by a print process or when a sheet is replaced, display of the remaining amount of the sheet is changed accordingly. When there is no sheet, no symbol is displayed. The symbol for the remaining sheet amount illustrated in FIG. 3 is an example. The remaining sheet amount may be displayed in an arbitrary manner. For example, other character strings such as "much" and "little" or a specific length (meters, etc.) may be displayed.

In addition, display examples of the use status of a sheet in each sheet cassette include "in use," "waiting," "not in use," "in progress of replacement," "unknown," and "in preparation." The use state "in use" signifies that a sheet is being used in a print process. The use state "in use" is also displayed while cut sheets are being wound by the sheet winding unit 113 in two-sided printing. In addition, the use status "in use" is displayed while a sheet is processed after being wounded. The use status "waiting" is displayed for a sheet to be used.

The use status "not in use" is displayed for a sheet that is not to be used. The use state "in progress of replacement" is displayed while a sheet magazine door is open and work is implemented for sheet replacement. If information about a sheet is unknown, the sheet is represented by the use status "unknown." In the present exemplary embodiment, when no sheet is set, the status "unknown" is displayed. However, for example, "no sheet" may be displayed in such case. There are cases where, even after a sheet has already been set, a print process cannot be started because an initialization process or the like is in progress. In such case, the use status "in preparation" is displayed.

An area 306 displays an estimate time of when each of the sheets (sheet cassettes) is used. Namely, since three sheets are present in the sheet use order, the start time, the end time, and the required time are displayed for each of the first to third sheets. Since a print process has already been started and the first sheet is being used, the start time is not displayed. The above information is calculated based on information about the print jobs managed by a queue, the current time, and the like. The display of the information is updated accordingly as the print process progresses.

While not illustrated in FIG. 3, for example, other statuses of a sheet in each sheet cassette are also displayed, such as the sheet size (sheet width) and the sheet type (material). In addition, a list of print jobs managed by a queue is also displayed. In addition, for each print job, a job ID, information about a sheet used (size, material), a sheet cassette used, a print data file name, an estimated print start time, an estimated print end time, a required time, and a status (waiting, image processing, print process, etc.) are also displayed.

Next, a process executed when a user exchanges a sheet in a sheet cassette will be described with reference to a flow chart in FIG. 4. The CPU 201 executes the process in the flow chart, by loading a control program stored in the ROM 202 or the HDD 204 to the RAM 203.

In step S401, if the CPU 201 detects that a sheet magazine door for any one of the sheet cassettes of the image forming apparatus 200 is open, the process proceeds to step S402. In the image forming apparatus 200, the user can execute sheet replacement unless a sheet in the sheet cassette to be replaced is being used for printing. If a sheet is being used for printing, the sheet magazine door for the sheet cassette storing the sheet is locked. If a user stops printing, the door can be unlocked.

In step S402, the use status of the sheet corresponding to the open sheet magazine door is changed to "in progress of replacement" on the display screen of the operation unit 206 in FIG. 3. In step S403, the image forming apparatus 200 executes a replacement process so that the user can execute sheet replacement easily. For example, in the replacement process, the image forming apparatus 200 automatically moves the sheet magazine so that the user can extract the sheet magazine easily. Subsequently, the user extracts the sheet magazine, loads a new sheet in this sheet magazine, and sets the sheet magazine in the sheet cassette.

Next, in step S404, if the CPU 201 detects that the sheet magazine is set in the sheet cassette and the door is closed (YES in step S404), the process proceeds to step S405. In the present exemplary embodiment, when the CPU 201 detects that the door is closed, the CPU 201 determines that the user has completed sheet replacement. After determining that the user has completed sheet replacement, by idly rotating the sheet, availability of the sheet, the remaining sheet amount, the sheet width, and the like are checked. Namely, in step S405, the CPU 201 checks sheet information (sheet size, sheet type, etc.) about the newly set sheet. In this step, the CPU 201 checks the sheet information, by causing an image sensor (not illustrated) to read sheet information printed on the sheet and to send the obtained information to the CPU 201. Alternatively, the CPU 201 may acquire the sheet information from the user via the operation unit 206. Various other methods can be used to check the sheet information.

Next, in step S406, the CPU 201 determines whether the CPU 201 has acquired the sheet information in step S405. For example, if the CPU 201 fails to read the sheet information printed on the sheet accurately or if the user does not input the sheet information appropriately to the operation unit 206, the CPU 201 cannot acquire the sheet information. If the CPU 201 determines that the CPU 201 has acquired the sheet information (YES in step S406), the process proceeds to step S407. If not (NO in step S406), the process proceeds to step S411.

In step S407, based on the acquired sheet information, the CPU 201 determines whether the newly set sheet is usable by a print job that is currently executed by the image forming apparatus 200 or by a print job stored in the print queue that has already been inputted to the image forming apparatus 200. In this step, the CPU 201 makes the determination based on information about print jobs managed by the queue as described above. If the CPU 201 determines that the newly set sheet is usable by a print job that is currently executed or by a print job stored in the print queue (YES in step S407), the process proceeds to step S408. If the CPU 201 determines that the sheet is not usable by either print job (NO in step S407), the process proceeds to step S410.

Even if sheet information specified by a print job does not match information about a sheet set in a sheet cassette, the CPU 201 may determine that the sheet is usable by the print job. For example, the CPU 201 may determine that a sheet having a width greater than a width specified by the print job is usable, since it is only necessary to cut the sheet after printing in this case. By using the operation unit 206 or the like, the user registers such usable sheet having a width greater than a width specified by a print job in the RAM 203 or the like. If a sheet having a width greater than a width specified by a print job is usable, the CPU 201 adds such a sheet to a list of usable sheets and determines the sheet use order.

In step S408, the CPU 201 refers to setting information that is stored in the RAM 203 or the HDD 204 and that is related to operations of the image forming apparatus 200, to determine whether a setting for reexamining the sheet use order at sheet replacement is ON. When a new sheet is set, the CPU 201 refers to this setting. The setting represents whether to initialize a predetermined order in which the individual sheets are used and to reexamine the order in which the sheets including the newly set sheet are used. If the setting is ON (YES in step S408), then in step S409, the CPU 201 reexamines the use order. If not (NO in step S408), the CPU 201 ends the flow. The user can change ON/OFF of this setting, by using the operation unit 206 or the host apparatus 211. The setting is stored in the RAM 203 or the HDD 204.

If the CPU 201 does not reexamine the use order (NO in step S408), the CPU 201 uses the same use order as used before sheet replacement (the sheet use status is changed from "in progress of replacement" to "waiting"). If sheet information about the newly set sheet differs from sheet information about the sheet replaced, the use order of the replaced sheet will be invalid (the sheet use status is changed to "not in use"). If there is a sheet having a lower priority than that of the replaced sheet, the priority of this sheet is increased in the use order. In addition, if the use status of the replaced sheet represents "not in use" or "unknown" before sheet replacement, the use status represents "not in use" after sheet replacement. In step S409, the CPU 201 initializes the predetermined sheet use order, reexamines the use order including the newly set sheet, and determines a new order in which the sheets are used. This step will be described in detail below.

In step S410, since the newly set sheet is not to be used, the CPU 201 changes the use status of this sheet from "in progress of replacement" to "not in use." In this step, if the replaced sheet is included in the use order and if there is a sheet with a lower priority than that of the replaced sheet, the priority of this sheet is increased in the use order. In step S411, since sheet information about the newly set sheet is unknown, the CPU 201 changes the use status of this sheet from "in progress of replacement" to "unknown." In this step, if the replaced sheet is included in the use order and if there is a sheet with a lower priority than that of the replaced sheet, the priority of the sheet is increased in the use order.

Figure 5:
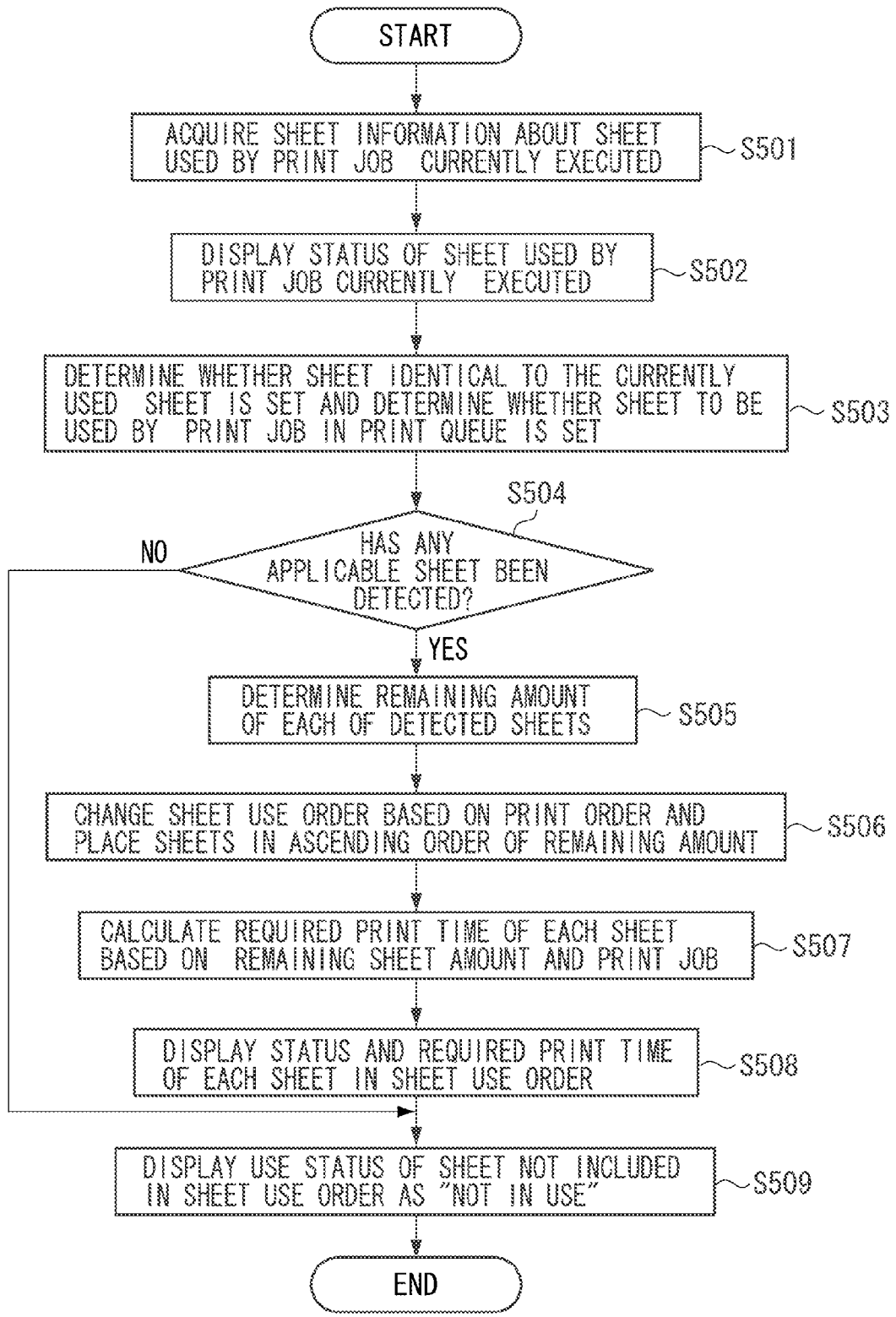

Next, step S409 will be described in detail with reference to a flow chart in FIG. 5. In step S501, the CPU 201 acquires sheet information about the sheet used by a print job that is currently executed by the image forming apparatus 200 managed by the above queue. Next, in step S502, the CPU 201 causes the operation unit 206 to display the status of the sheet used by the print job currently executed. In this step, as illustrated in the area 302 in FIG. 3, the sheet is represented by the use order "1st," an updated remaining sheet amount, and the use status "in use." If the image forming apparatus 200 is not executing any print process, the CPU 201 skips steps S501 and S502.

Next, in step S503, if the image forming apparatus 200 is currently executing a print process, the CPU 201 determines whether a sheet of a type identical to that of the currently used sheet is set in any one of the sheet cassettes other than the sheet cassette storing the currently used sheet. In addition, the CPU 201 determines whether anyone of the sheet cassettes stores a sheet to be used by a print job in the print queue.

Next, in step S504, the CPU 201 determines whether there are applicable sheets. If any applicable sheets have been detected (YES in step S504), the process proceeds to step S505, in which the CPU 201 checks the remaining amount of each of the detected sheets. Next, in step S506, the sheet use order is changed based on the execution order of the print jobs using the respective sheets. The sheets of the same type are ordered so that the sheet having the least remaining amount is used first (in ascending order of remaining amounts). In this way, the user can replace sheets of the same type at different timings.

Namely, after the sheet having the least remaining amount is completely used, a sheet having a more remaining amount can be used, and a new sheet can be set in the sheet cassette corresponding to the sheet completely used. In addition, a continuous sheet cannot be added in the same way as cut sheets. Thus, if the sheet is used completely, the sheet can be used more efficiently. In step S505, if some of the applicable sheets have approximately the same remaining amount, the CPU 201 determines the sheet use order based on a predetermined priority (for example, a sheet having the shortest conveyance distance is used first). In addition, if a single sheet is used continuously, the sheet cassettes are switched less frequently. As a result, the image forming apparatus 200 can execute a print process more effectively.

As described above, when a plurality of sheets of the same type are present as candidates, a sheet having the least remaining amount is used first. This idea is applicable to other consumables. For example, when ink of an identical type is stored in some of the ink tanks 109, if these ink tanks can supply ink to the respective print heads 106, the ink tank having the least remaining amount may supply ink. In this way, since ink in a certain ink tank can be used completely first, the ink tanks can be replaced at different timings, as in the case of the above sheets.

In step S507, based on the determined remaining amount of each of the sheets, the print job currently executed, and the print jobs stored in the print queue, the CPU 201 calculates the required print time of each of the sheets. Since the sheet conveyance distance of a sheet varies depending on the sheet cassette storing the sheet, the CPU 201 calculates the required print time based on the sheet conveyance distance as well. Next, in step S508, the operation unit 206 displays the status and the required print time determined by the above steps for each of the sheets, as illustrated in FIG. 3. After the above steps, if the CPU 201 determines a sheet that is not used, in step S509, the CPU 201 causes the operation unit 206 to display the use status "not in use" and an updated remaining sheet amount of this sheet.

Figure 4:
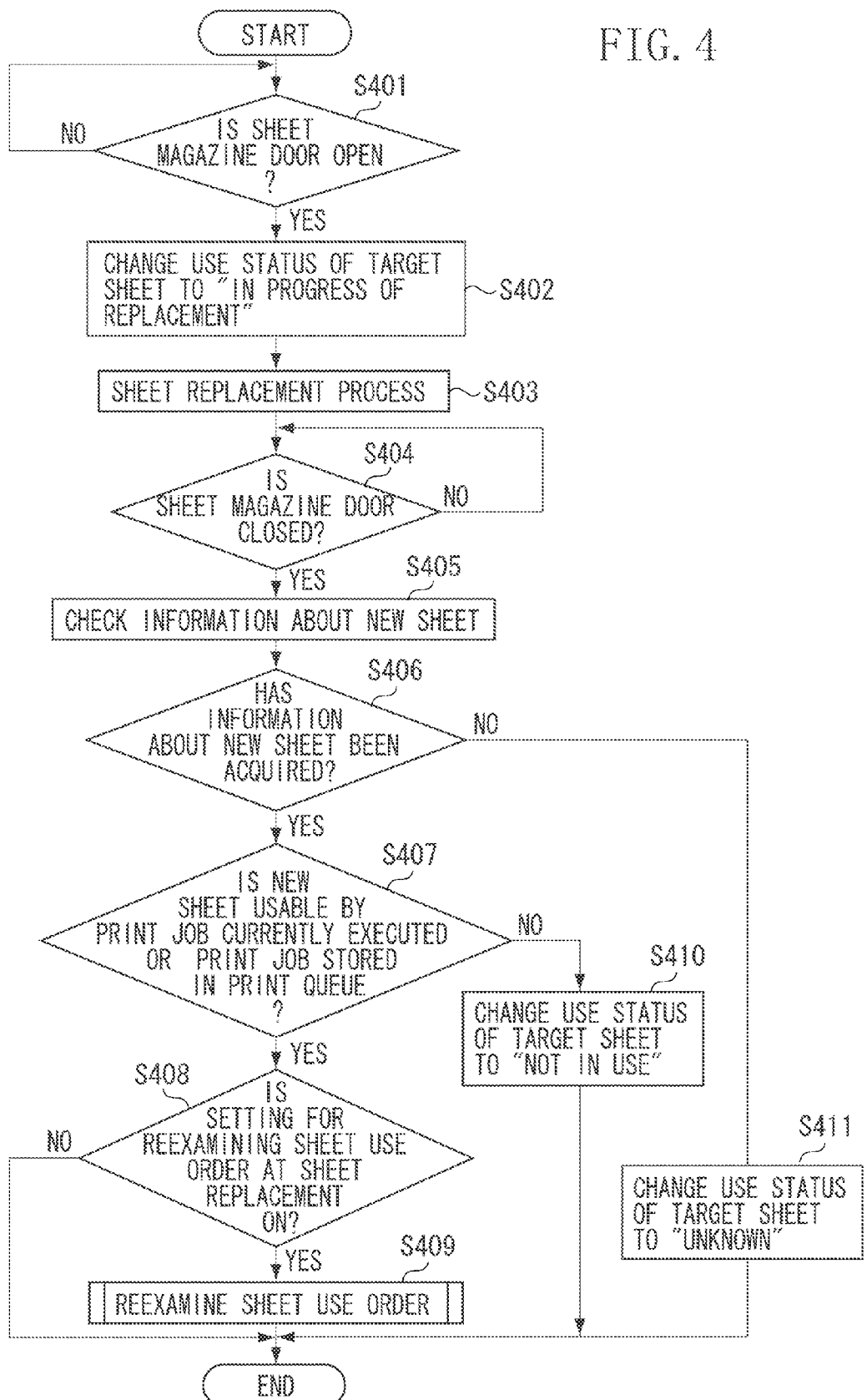
FIGS. 4 to 6 are flow charts illustrating processes according to the exemplary embodiment of the present invention.

The CPU 201 determines the sheet use order and the operation unit 206 displays the results not only at a timing corresponding to step S409 in FIG. 4 but also at various other timings, such as when the image forming apparatus 200 receives a new print job and starts a print process. As the print process progresses, the CPU 201 updates information about the sheet status and the like. Accordingly, the operation unit 206 updates display contents. Namely, the CPU 201 acquires information about the status of each of the sheets stored in a plurality of cassettes set in the image forming apparatus 200 in a timely manner. In addition, the CPU 201 causes the operation unit 206 to change the display contents, as the status of a sheet changes. The status of each of the sheets is constantly checked while the engine control unit 208 of the image forming apparatus 200 is active.

Figure 6:
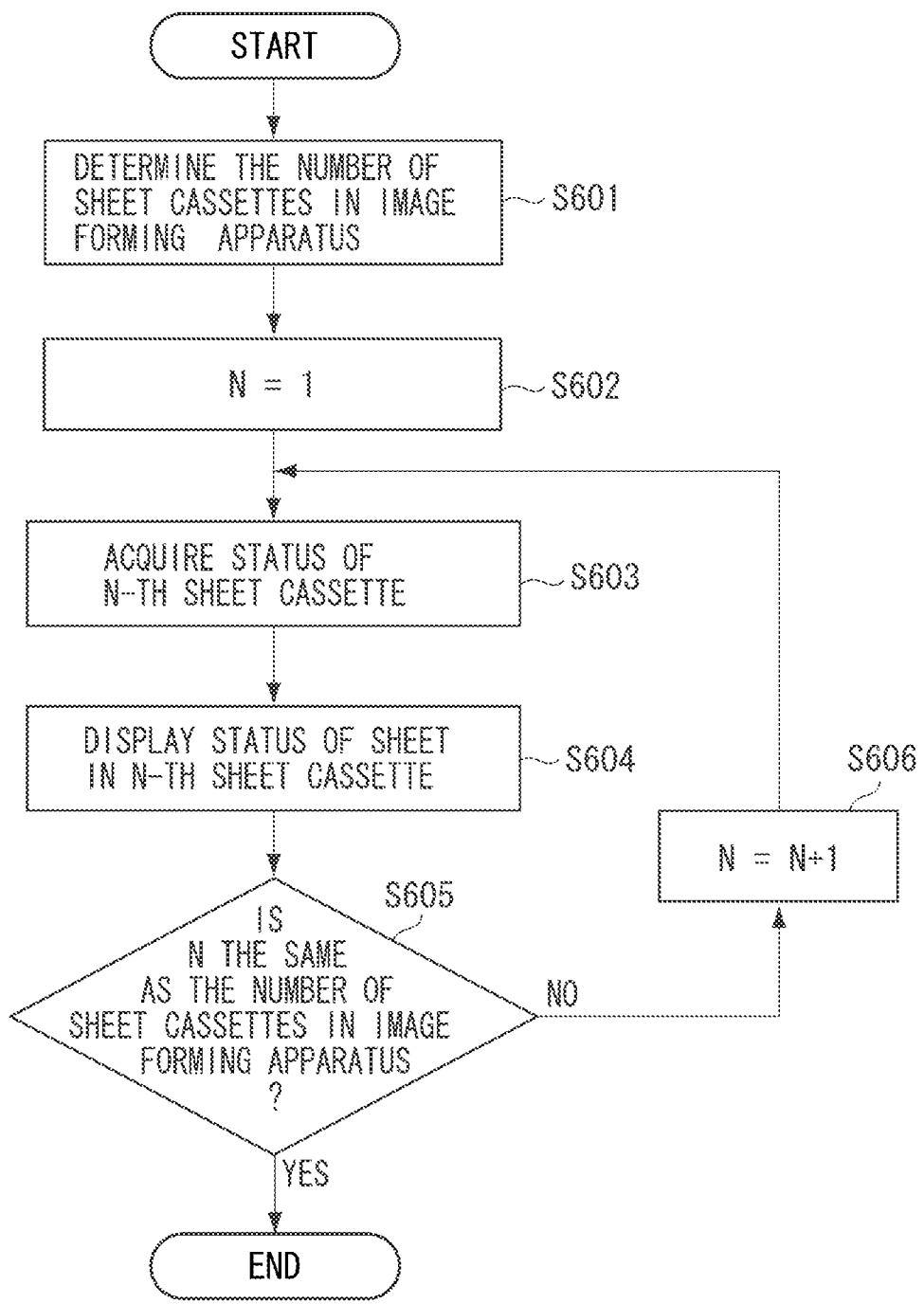

FIG. 6 is a flow chart illustrating a process of determining the status of each of the sheets stored in a plurality of sheet cassettes set in the image forming apparatus 200. The CPU 201 executes the process in the flow chart, by loading a control program stored in the ROM 202 or the HDD 204 to the RAM 203.

First, in step S601, the CPU 201 determines the number of sheet cassettes set in the image forming apparatus 200. In this step, the CPU 201 sends an inquiry to the engine control unit 208 and determines that four sheet cassettes are present in total (the sheet cassettes 101a and 101b and two additional sheet cassettes). The determined number of sheet cassettes is stored in the RAM 203 or the HDD 204.

Next, the CPU 201 sets a value N identifying the sheet cassette to be checked to 1. In this exemplary embodiment, the CPU 201 sets the values N of the sheet cassettes 101a and 101b to 1 and 2, respectively. In addition, the CPU 201 sets the values N of the upper and lower additional sheet cassettes to 3 and 4, respectively. These values N correspond to the use order of the sheet cassettes.

Next, in step S603, the CPU 201 acquires the status of the N-th sheet cassette. More specifically, in step S603, the CPU 201 determines whether the N-th sheet cassette stores sheets. If sheets are stored, the CPU 201 acquires information about the size, the type, the remaining amount of the sheets, for example. In step S604, based on the sheet cassette status acquired in step S603, the CPU 201 instructs the operation unit 206 to display the status of the sheet as illustrated in FIG. 3.

In step S605, the CPU 201 determines whether the value N matches the number of sheet cassettes in the image forming apparatus 200, which is stored in step S601. If the value N is different (NO in step S605), then in step S606, the CPU 201 increases the value N by 1, and the operation returns to step S603. If the value N matches the number of sheet cassettes (YES in step S605), that is, if the CPU 201 has acquired the status of each of the sheet cassettes in the image forming apparatus 200, the CPU 201 ends this flow. Subsequently, the operation returns to step S601 to repeat the process.

For example, assuming that the status of each of the sheets is displayed as illustrated in FIG. 3 before sheet replacement, after sheet replacement, the display screen changes as follows through the above process. In this example, the sheets indicated by the areas 302 and 303 represent identical sheet information.

If replacement of the sheet indicated by the area 303 is started, in step S402, "2nd" is changed to "?," display of the remaining sheet amount disappears, and "waiting" is changed to "in progress of replacement" in the area 303. Subsequently, if the setting for reexamining the sheet use order at sheet replacement is OFF (NO in step S408), the area 303 displays the same information as displayed before sheet replacement (from "?" to "2nd" and from "in progress of replacement" to "waiting"). However, the remaining sheet amount is displayed based on the set sheet. If the process proceeds to step S410, the sheet status "?" displayed in the area 303 disappears. In addition, the remaining sheet amount is displayed based on the set sheet, and "in progress of replacement" is changed to "not in use." In addition, the sheet status "3rd" displayed in the area 304 is changed to "2nd." If the process proceeds to step S411, the sheet status in the area 303 only displays "unknown." In addition, the sheet status "3rd" displayed in the area 304 is changed to "2nd."

In the above process, if the CPU 201 determines that no sheet cassette stores a sheet usable by any one of the print jobs, the CPU 201 causes the operation unit 206 to display error information and necessary sheet information. In addition, even if a sheet usable by a print job is set in a sheet cassette, if the CPU 201 predicts that the sheet is insufficient for the print job, the CPU 201 notifies the user of the status. Namely, based on each print job and the remaining amount of each sheet, the CPU 201 determines a sufficient sheet amount. If the CPU 201 determines that the sheet is insufficient, the CPU 201 causes the operation unit 206 to display the status and necessary sheet information.

Thus, the CPU 201 determines the use order of a plurality of sheets and causes the operation unit 206 to display the results. In this way, the user can check various information about the sheets to be used and work accordingly. Thus, various types of inconvenience can be prevented. For example, when executing sheet replacement, users can be prevented from opening a sheet magazine door corresponding to a sheet cassette storing the sheet ready to be used. In addition, before the apparatus stops a print process because of an insufficient remaining sheet amount, the user can execute sheet replacement. In the above description, the operation unit 206 displays various information. However, the information may be transmitted to the host apparatus 211 via the external I/F 205, so that a display device of the host apparatus 211 can display the information.

In addition, as described above, a sheet that does not match sheet information specified by a print job (a sheet with a larger size (sheet width)) may be used. In such case, the sheet use order is determined based on the following conditions. First, a sheet matching the sheet information specified by a print job has the highest priority. A sheet having a smaller margin (smaller width difference from that specified by the print job) is used next. A sheet having a larger margin has a lower priority. If a plurality of sheets having the same size are present, a sheet having a smaller remaining amount has a higher priority. However, if continuous use of a sheet that is being used is effective, even if a sheet identical to sheet information specified by a subsequent print job is set in another sheet cassette, the sheet that is being used may preferentially be used. In this way, for example, it is possible to omit or reduce cutting of the sheet that is being used and winding of the sheet into a cassette. As a result, efficiency is improved. Users give instructions to the operation unit 206 to register whether to preferentially use the sheet that is being used in the RAM 203 or the like. In this way, if the RAM 203 represents that such sheet needs to be used preferentially, the CPU 201 determines the use order accordingly.

In addition, in the above description, a continuous sheet such as a roll sheet is used as a sheet. However, cut sheets, which are cut into a predetermined size in advance, may be used for printing. Namely, the apparatus may include a plurality of sheet cassettes storing cut sheets. In this way, the apparatus determines the sheet size and the remaining sheet amount in each sheet cassette, determines the use order of the sheet cassettes as in the case of the above roll sheets, and causes the operation unit 206 or the like to display the results. In this way, users can easily determine sheet supply timings. In addition, the apparatus may include both sheet cassettes for continuous sheets and sheet cassettes for cut sheets. In this case, the apparatus selects any one of the sheet cassettes to print images. In addition, it is useful that various conditions are examined when the sheet use order is determined, so that sheets are replaced at different timings, printing is executed more efficiently (quickly), or a sheet having a smaller margin is used preferentially. However, for example, other conditions than the above conditions may be further added or some of the conditions may be replaced according to user preference.

As described above, according to the present exemplary embodiment, the sheets usable by a plurality of subsequent print jobs are determined, and the use order of the sheets is determined. The results and a sheet schedule are presented to users. Thus, users can execute sheet replacement to load a new sheet at an appropriate timing. In addition, since sheets in a plurality of sheet cassettes can be replaced at different timings, downtime required by sheet replacement or the like can be reduced. In addition, the sheet use order can be determined so that printing of a plurality of print jobs can be executed more quickly or so that wasteful use of a sheet is reduced.

An external apparatus such as a host apparatus or an external controller may execute the above-described processes relating to the print order scheduling and the sheet use order, except for the print process. In such case, the image forming apparatus executes printing based on the external apparatus. The external apparatus acquires the status (information about the current print status, sheet cassettes, etc.) from the image forming apparatus to determine the sheet use order and the page print order. Namely, in this case, the external apparatus functions as a printing control apparatus.

In addition, the present exemplary embodiment can also be realized by executing the following process. Namely, the present exemplary embodiment can be realized by supplying software (program) realizing functions of the above exemplary embodiment to a system or an apparatus via a network or any of various types of storage medium and by causing a computer (a CPU, an MPU, etc.) of the system or the apparatus to read and execute the program. The program may be executed by a single computer or a plurality of computers that operate in conjunction with each other. It is not necessary that all of the above processing be realized by software. Part or all of the processing may be realized by hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus configured to cause a printing unit to execute printing on a printing medium comprising:
   a specifying unit configured to specify a printing medium usable by at least one print job; and
   a notifying unit configured to notify a storage unit storing a printing medium to be used in a plurality of storage units based on a specifying result by the specifying unit and a remaining amount of each printing medium stored in the plurality of storage units.

2. The apparatus according to claim 1, wherein the notifying unit is configured to notify a use order of each printing medium stored in the plurality of storage units based on whether each printing medium stored in a plurality of storage units for storing printing medium is usable by the at least one print job.

3. The apparatus according to claim 2, wherein the notifying unit is configured to notify the use order so that the printing medium with a lowest remaining amount in a storage unit is preferentially used.

4. The apparatus according to claim 1, wherein the notifying unit is configured to notify the storage unit storing the printing medium stored in the storage unit to be used based on a specifying result, a remaining amount of each printing medium stored in the plurality of storage units, and whether the printing medium is currently used.

5. The apparatus according to claim 1, wherein the notifying unit is configured to notify a use order of each printing medium stored in the plurality of storage units based on the specifying result by the specifying unit and the remaining amount of each printing medium stored in the plurality of storage units.

6. The apparatus according to claim 1, wherein the notifying unit is configured to notify whether each printing medium stored in the plurality of storage units for storing printing mediums is used by the at least one print job.

7. The apparatus according to claim 1, wherein the notifying unit is configured to further notify information concerning a remaining amount of the printing medium in a storage unit.

8. The apparatus according to claim 1, wherein the notifying unit is configured to cause a display to display the storage unit storing the printing medium to be used.

9. The apparatus according to claim 1, wherein the printing medium is a continuous sheet.

10. The apparatus according to claim 1, further comprising a printing unit.

11. The apparatus according to claim 1, further comprising the plurality of storage units.

12. The apparatus according to claim 1, wherein the notifying unit is configured to notify the storage unit storing the printing medium to be used next.

13. The apparatus according to claim 1, wherein the notifying unit is configured to notify the storage unit storing the printing medium to be used so as to recognize a storage unit storing the printing medium to be used next.

14. The apparatus according to claim 1, wherein the notifying unit is further configured to notify a storage unit storing a printing medium being used in a print process in the plurality of storage unit.

15. The apparatus according to claim 1, wherein the notifying unit is further configured to notify a storage unit storing a printing medium not to be used based on a specifying result by the specifying unit in the plurality of storage unit.

16. The apparatus according to claim 1, wherein the notifying unit is further configured to notify a storage unit having no sheet in the plurality of storage unit.

17. The apparatus according to claim 1, wherein the notifying unit is further configured to notify a storage unit being in progress of replacement in the plurality of storage unit.

18. The apparatus according to claim 1, wherein the notifying unit is further configured to notify a storage unit being in progress of preparation in the plurality of storage unit.

19. The apparatus according to claim 1, wherein the notifying unit is configured to notify the storage unit storing the printing medium to be used in the plurality of storage units while performing the print process.

20. The apparatus according to claim 1, wherein the specifying unit is configured to specify a printing medium usable by at least one print job based on the printing medium information includes at least one sizes and materials.

21. A method for controlling a printing apparatus configured to execute printing on a printing medium by using a printing unit comprising:
specifying a printing medium usable by at least one print job;
notifying a storage unit storing a printing medium to be used in a plurality of storage units based on a specifying result and a remaining amount of each printing medium in the plurality of storage units.

22. A computer-readable storage medium that stores computer-executable program for performing a method, the method comprising:
specifying a printing medium usable by at least one print job; and
notifying a storage unit storing a printing medium to be used in a plurality of storage units based on a specifying result and a remaining amount of each printing medium in the plurality of storage units.

* * * * *